（12) United States Patent
Hiraiwa et al.

(10) Patent No.: US 11,198,829 B2
(45) Date of Patent: Dec. 14, 2021

(54) APPARATUS FOR MANUFACTURING A BIOMASS SOLID FUEL AND A METHOD FOR MANUFACTURING THE SAME

(71) Applicant: UBE INDUSTRIES, LTD., Ube (JP)

(72) Inventors: Yuusuke Hiraiwa, Ube (JP); Shigeya Hayashi, Ube (JP); Nobuyuki Ooi, Ube (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 16/652,624

(22) PCT Filed: Oct. 1, 2018

(86) PCT No.: PCT/JP2018/036715
§ 371 (c)(1),
(2) Date: Mar. 31, 2020

(87) PCT Pub. No.: WO2019/069860
PCT Pub. Date: Apr. 11, 2019

(65) Prior Publication Data
US 2020/0239800 A1     Jul. 30, 2020

(30) Foreign Application Priority Data

Oct. 4, 2017   (JP) .............................. JP2017-194540

(51) Int. Cl.
*C10L 5/44*        (2006.01)
*C10B 53/02*       (2006.01)
(Continued)

(52) U.S. Cl.
CPC .............. *C10L 5/442* (2013.01); *C10B 41/00* (2013.01); *C10B 47/30* (2013.01); *C10B 53/02* (2013.01);
(Continued)

(58) Field of Classification Search
CPC ......... C10B 41/00; C10B 47/30; C10B 53/02; C10L 2200/0469; C10L 2290/02;
(Continued)

(56) References Cited

U.S. PATENT DOCUMENTS

2008/0051614 A1    2/2008  Ida et al.
2008/0103747 A1*   5/2008  Macharia ............. G05B 13/048
                                              703/11
(Continued)

FOREIGN PATENT DOCUMENTS

JP          4088933 B       5/2008
JP      2017-043657 A       3/2017
(Continued)

OTHER PUBLICATIONS

International Preliminary Report on Patentability in International Application No. PCT/JP2018/036715 dated Apr. 16, 2020.
(Continued)

*Primary Examiner* — Ellen M Mcavoy
*Assistant Examiner* — Chantel L Graham
(74) *Attorney, Agent, or Firm* — Knobbe Martens Olson & Bear LLP (57) ABSTRACT

A biomass solid fuel with reduced self-heating. An apparatus for manufacturing a biomass solid fuel including a carbonization furnace for carbonizing a biomass molded block to obtain a biomass solid fuel; a yield calculator for calculating a yield of the biomass solid fuel and/or a temperature detector for measuring a temperature of the carbonization furnace; and a controller for controlling a heat source of the carbonization furnace; in which the controller controls the heat source based on a correlation between (i) a self-heating property of the biomass solid fuel and (ii) the yield and/or the temperature of the carbonization furnace.

7 Claims, 6 Drawing Sheets

(51) Int. Cl.
*C10B 47/30* (2006.01)
*C10B 41/00* (2006.01)

(52) U.S. Cl.
CPC ... *C10L 2200/0469* (2013.01); *C10L 2290/02* (2013.01); *C10L 2290/32* (2013.01); *C10L 2290/58* (2013.01)

(58) Field of Classification Search
CPC .. C10L 2290/32; C10L 2290/58; C10L 5/442; C10L 5/447; C10L 9/08; Y02E 50/10; Y02E 50/30
See application file for complete search history.

(56) References Cited

U.S. PATENT DOCUMENTS

2017/0218290 A1* 8/2017 Hayashi .................... C10L 5/36
2019/0048267 A1 2/2019 Endo et al.

FOREIGN PATENT DOCUMENTS

| JP | 2017-145335 A | 8/2017 |
| WO | WO 2016/056608 A1 | 4/2016 |

OTHER PUBLICATIONS

Examination Report in counterpart Australian Application No. 2018345068 dated Feb. 24, 2021.

* cited by examiner

APPARATUS FOR MANUFACTURING A BIOMASS SOLID FUEL AND A METHOD FOR MANUFACTURING THE SAME

This application is the U.S. National Phase under 35 U.S.C. § 371 of International Application PCT/JP2018/036715, filed Oct. 1, 2018, designating the U.S., and published in Japanese as WO 2019/069860 on Apr. 11, 2019 which claims priority to Japanese Patent Application No. 2017-194540, filed Oct. 4, 2017, the entire content of which is incorporated herein by reference.

TECHNICAL FIELD

The present invention relates to an apparatus for manufacturing a biomass solid fuel and a method for manufacturing a biomass solid fuel.

BACKGROUND ART

In the past, in Patent Document 1, semi-carbonization was carried out by pressure-molding while heating pulverized biomass, and thereby obtaining a bio-coke having excellent strength.

CITATION LIST

Patent Document
Patent Document 1: Japanese Patent Publication No. 4088933

SUMMARY OF INVENTION

Technical Problem

For a solid fuel, it is important to suppress heat generation (self-heating) during handling, but the above-mentioned Patent Document 1 does not disclose a problem about the self-heating and a solution to the problem.

The present invention has been made to solve the above problem, and the object of the present invention is to provide a biomass solid fuel in which a self-heating is suppressed.

Solution to Problem

The present invention is characterized by that the apparatus comprises: a carbonization furnace for carbonizing a biomass molded block to obtain a biomass solid fuel; a yield calculator for calculating a yield of the biomass solid fuel and/or a temperature detector for measuring a temperature of the carbonization furnace; and a controller for controlling a heat source of the carbonization furnace; wherein the controller controls the heat source based on a correlation between (i) a self-heating property of the biomass solid fuel and the yield and/or the temperature of the carbonization furnace.

Advantageous Effect of Invention

According to the present invention, there is provided a biomass solid fuel in which a self-heating is suppressed.

DESCRIPTION OF EMBODIMENTS

Embodiment (Overall configuration)

Figure 1:
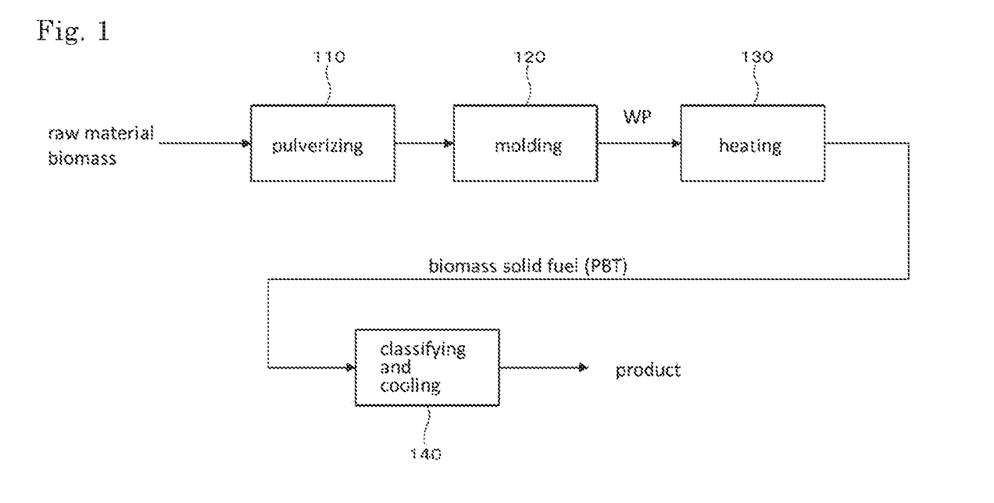
FIG. 1 is a process flow chart showing a process from a biomass raw material to obtaining a product by using the apparatus for manufacturing a biomass solid fuel of the present invention.

FIG. 1 shows a process flow from a biomass raw material to obtaining a biomass solid fuel (referred to as PBT described later) which is optionally a classified and cooled product. The biomass raw material is subjected to a crushing and pulverizing step 110 and then molded into a pellet shape in a molding step 120 (WP described later), and subsequently heated in a heating step 130. In the molding step 120, a bonding agent such as a binder is not added, and molding is performed simply by compressing and pressurizing the pulverized biomass. The biomass solid fuel (PBT described later) obtained through the heating step 130 becomes a product which may be subjected to a classifying and cooling step 140 as necessary.

The unheated biomass molded product (White Pellet: hereinafter referred to as WP) which is obtained immediately after passing through the molding step 120 has a low strength and is easily disintegrated during handling because the pulverized biomass is merely pressure molded. In addition, it swells and disintegrates due to water absorption.

Therefore, in the present invention, the biomass molded product (WP) is heated at 150 to 400° C. (carbonized at a low temperature) in the heating step 130 (rotary kiln 2) to produce a biomass solid fuel having strength and water resistance while maintaining the shape as a molded product (Pelletizing Before Torrefaction: hereinafter referred to as PBT). For the above-mentioned crushing and pulverizing step 110, the molding step 120 and the heating step 130, the manufacturing steps of the biomass solid fuel described in the international application No. PCT/JP2015/78552 may be referred to.

Figure 2:
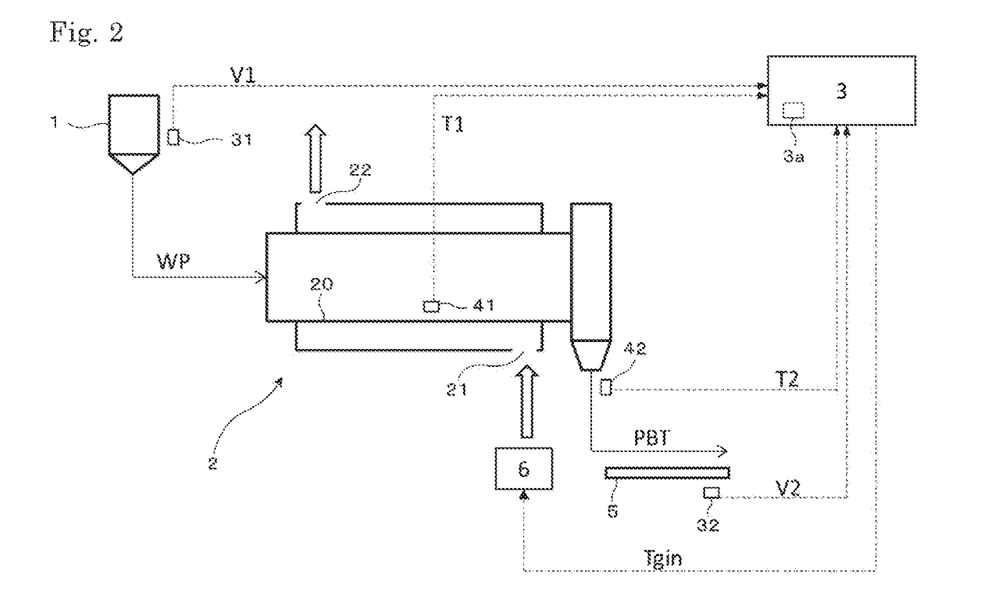
FIG. 2 is a diagram showing one embodiment of a system configuration of the manufacturing apparatus of the present invention.

FIG. 2 is a system configuration diagram of one embodiment of the heating step 130, The apparatus for manufacturing a biomass solid fuel of the present invention comprises a hopper 1, a rotary kiln 2 as a carbonization furnace and a controller 3. The WP stored in the hopper 1 is supplied to the rotary kiln 2 and heated to produce PBT (biomass solid fuel). The produced PBT is transported using a conveyor 5.

In one embodiment of the present invention, the rotary kiln 2 is an external heating type, and heat gas from the external heat source 6 is fed from an inlet 21 on the outer side of the kiln body 20 and discharged from the outlet 22, and thereby heating is indirectly carried out. The controller 3 controls the external heat source 6 to appropriately change the temperature of the heat gas at inlet 21 (heat gas inlet temperature Tgin) and controls the temperature of the rotary kiln 2. The rotary kiln 2 shown in FIG. 2 has a countercurrent system in which the flow of the object to be heated (PBT) and the flow of the heat gas are opposed to each other. However, a co-current flow system may also be employed. The oxygen concentration in the rotary kiln 2 is adjusted to 10% or less.

A feed amount measuring instrument 31 for measuring the feed amount V1 of WP is provided on the upstream of the rotary kiln 2, and a production amount measuring instrument 32 for measuring the production amount V2 of PBT is provided on the downstream of the rotary kiln 2. The measured feed amount V1 of WP and the production amount V2 of PBT are output to the controller 3, and the yield calculator 3a calculates the yield Y in the rotary kiln 2 (heating step 130). In the present invention, the yield Y represents a solid yield (=weight yield).

The feed amount V1 of WP and the production amount V2 of PBT may be obtained by calculating from the bulk densities of WP and PBT measured in advance and the volume change within a predetermined time, or may be obtained by measuring the weight thereof. The feed amount measuring instrument 31 and the production amount measuring instrument 32 may be appropriately changed according to the respective methods.

A temperature detector 41 is provided inside the kiln body 20 of the rotary kiln 2 to measure the kiln internal temperature T1. A temperature detector 42 is provided at the outlet of the rotary kiln 2 to measure the kiln outlet temperature T2 (i.e. the temperature of PBT immediately after production). Both of T1 and T2 are output to the controller 3. In one embodiment of the present invention, the temperature of the rotary kiln 2 may be determined based on only one of the kiln internal temperature T1 and the kiln outlet temperature T2. When only the kiln internal temperature T1 is used, the temperature detector 42 may not be provided in the manufacturing apparatus. When only the kiln outlet temperature T2 is used, the temperature detector 41 may not be provided in the manufacturing apparatus.

The controller 3 controls the temperature of the heat gas at the inlet 21 (heat gas inlet temperature). A known method is used to control the temperature of the heat gas. In the method, the control of the heat gas inlet temperature Tgin is performed based on at least one selected from the yield Y, the temperature T1, and the temperature T2. In Embodiment 1 described later, the control based on yield Y is performed. In Embodiment 2, the control based on temperature(s) T1 and/or T2 is performed. In Embodiment 3, the control based on (i) yield Y and (ii) temperature T1 and/or T2 is performed.

(Control of the Self-Heating Property)

In the handling of the solid fuel, reducing a heat generation (self-heating) during storage and transportation is a problem to be solved. As an index of the self-heating property, the self-heating property test specified in "UNITED NATIONS Recommendations on the TRANSPORT OF DANGEROUS GOODS: Manual of Test and Criteria: 5th revised Edition: Test method for Self-heating substances" is known, and the details thereof are as follows.

A sample was charged into a stainless-steel container of 100 mm cube and the stainless-steel container was suspended inside of a thermostat oven at a temperature of 140° C., and the temperature of the material was measured for 24 hours continuously. The highest temperature thereof was defined as the "maximum reaching temperature". Material that ignition occurs or whose temperature rise to 200° C. or more is determined as a self-heating material.

The self-heating property of the biomass solid fuel can be controlled by adjusting the yield. Y and/or the temperature of the rotary kiln 2 to be within a predetermined range, as described in the following Embodiments 1 to 3.

Embodiment 1: Control by Yield

Figure 3:
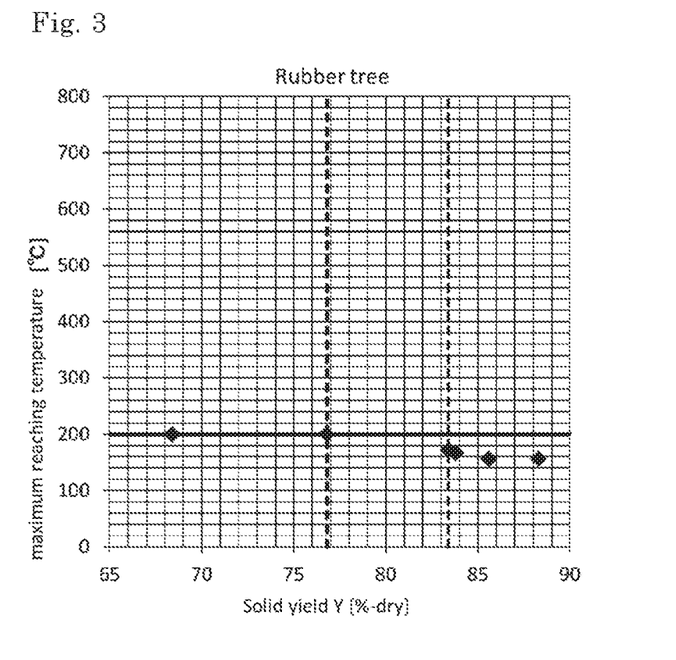
FIG. 3 is a graph showing the correlation between a self-heating property and a yield of a solid fuel where rubber tree is used as a raw material.
Figure 4:
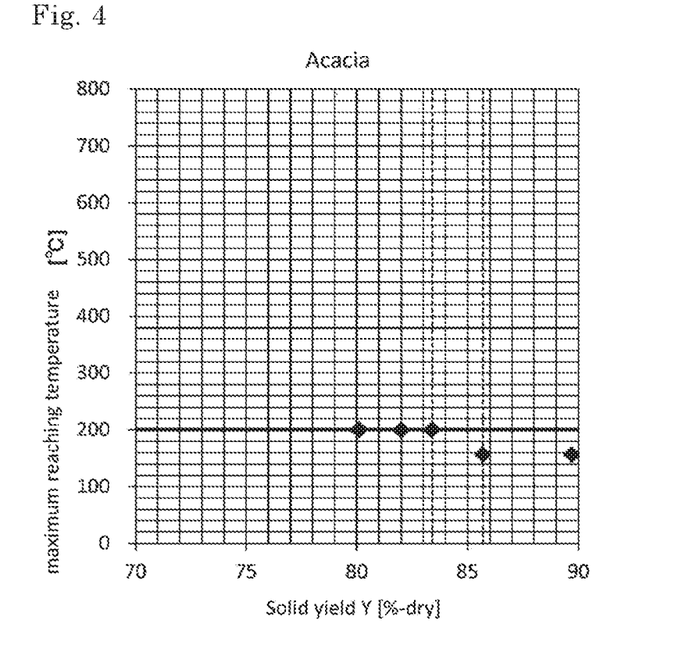
FIG. 4 is a graph showing the correlation between a self-heating property and a yield of a solid fuel where acacia is used as a raw material.
Figure 5:
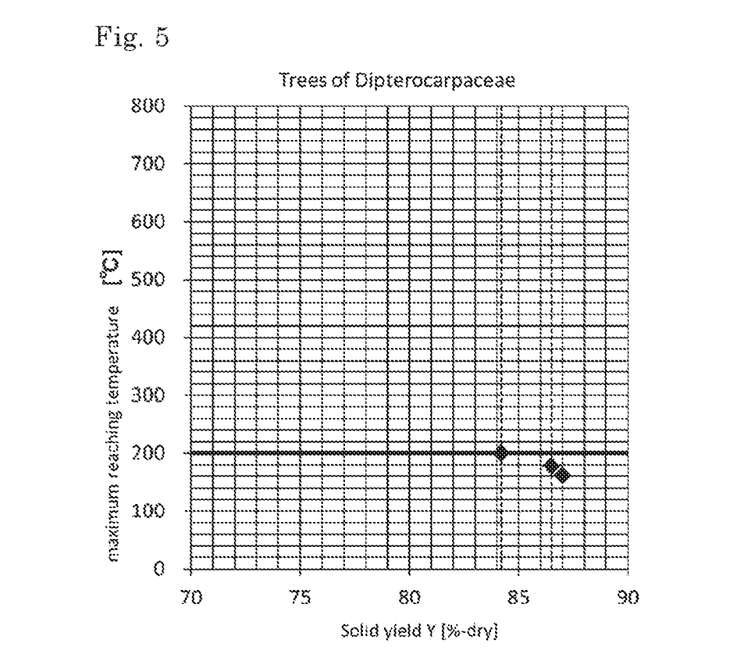
FIG. 5 is a graph showing the correlation between a self-heating property and a yield of a solid fuel where tree species of Dipterocarpaceae is used as a raw material.
Figure 6:
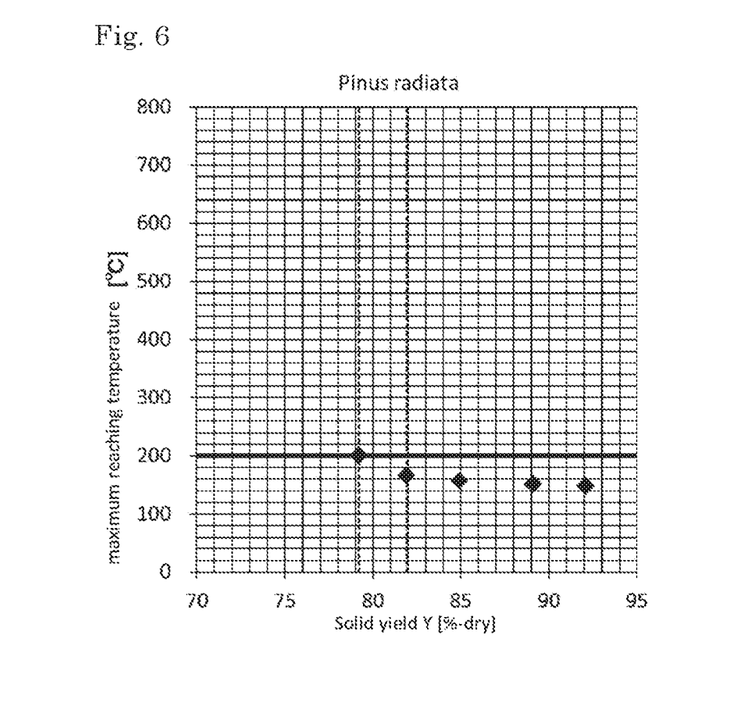
FIG. 6 is a graph showing the correlation between a self-heating property and a yield of a solid fuel where *Pinus radiata* is used as a raw material.
Figure 7A:
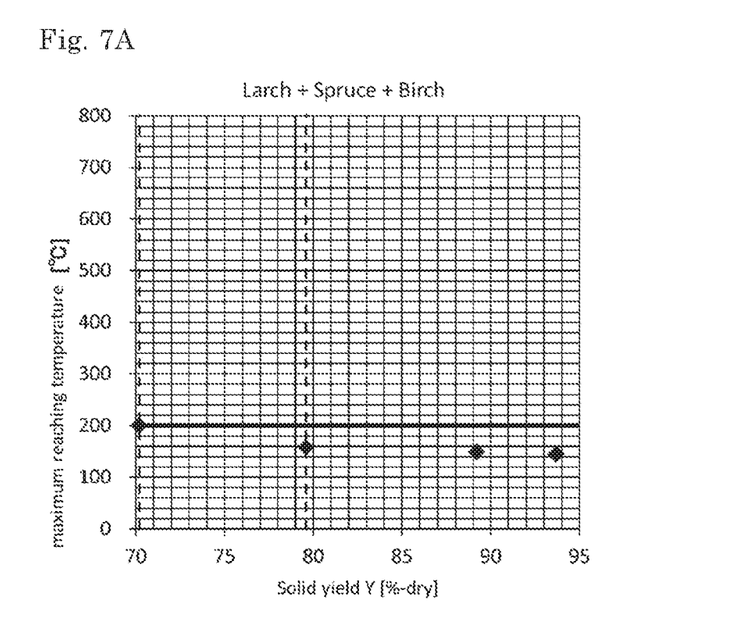
FIG. 7A is a graph showing the correlation between a self-heating property and a yield of a solid fuel where a mixture of larch, spruce and birch is used as a raw material.
Figure 7B:
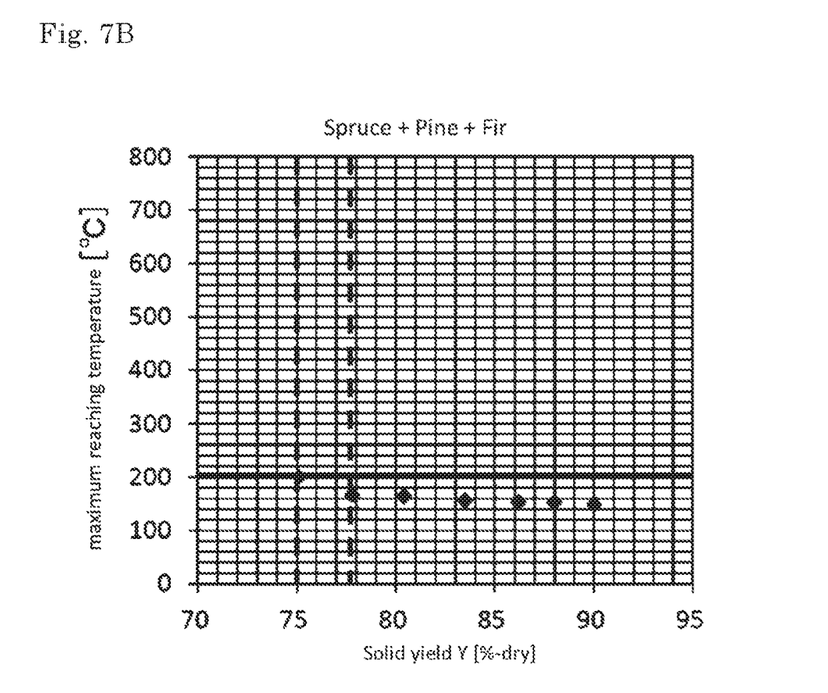
FIG. 7B is a graph showing the correlation between a self-heating property and a yield of a solid fuel where a mixture of spruce, pine and fir is used as a raw material.

FIG. 3 to FIG. 7B and Table 1 described below show the correlation between a maximum reaching temperature of the sample when the above self-heating property test is performed and a yield Y (also referred to as "solid yield Y") for PBT using various biomass as raw materials. The yield Y is a value calculated by (100×dry weight after heating dry weight before heating) (%). FIG. 3 shows the relationship between the solid yield and the maximum reaching temperature of PBT using rubber tree as a raw material. The evaluation based on these indexes showed a certain correlation between the yield Y and the self-heating property (the temperature increase in the above test) of PBT is shown. For example, it is found that in FIG. 3 and Table 1, when the yield. Y is equal to or more than the lower limit value Ymin (about more than 76.8% and 83.4% or less), the maximum reaching temperature in the self-heating property test is suppressed to less than 200° C.

Thus, it is possible to obtain PBT having reduced self-heating by setting the lower limit value Ymin of the yield Y as a threshold value in advance and controlling the temperature of the heat gas so that the yield Y becomes equal to or more than the lower limit value Ymin. Since the yield Y decreases as the temperature of the rotary kiln 2 (heating step 130) increases, it is determined that, the temperature of the rotary kiln 2 is too high if the yield Y is lower than the lower limit value. Therefore, the heat gas inlet temperature Tgin temperature is decided to be lowered.

Table 1 below also shows a correlation between the temperature rise due to the self-heating of the solid fuel and the amount of the volatile matter (dry ash free basis) of the solid fuel. That is, as the volatile matter (dry ash free basis) of the solid fuel is smaller, the maximum reaching temperature in the self-heating property test becomes higher, which indicates that self-heating is increased. Therefore, when Ymin is decided, the amount of the volatile matter (dry ash free basis) may be taken into consideration.

On the other hand, an unnecessarily high yield Y means that the temperature of the rotary kiln 2 is low, and thereby carbonization of PBT becomes insufficient, causing problems such as strength, water resistance, and pollution of discharged water during storage of PBT (see, the above PCT/JP2015/78552). Therefore, the upper limit value Ymax of the yield Y is provided in advance, and if Y exceeds Ymax, the temperature of the heat gas inlet temperature Tgin is decided to be raised.

In one embodiment, Ymax may be determined based on water resistance when solid fuel is immersed in water (whether pellet shape can be maintained when immersed in water or not). A solid fuel which cannot maintain the pellet shape after being immersed in water may be disintegrated by rainwater or the like when it is stored outdoors, causing a problem in handling. Thus, it is preferable that the pellet shape of the solid fuel can be maintained even if the solid fuel is immersed in water. As shown in Table 1 below, in the case where the yield Y is too high (that is, the heating temperature during PBT production is too low), mutual bonding or adhesion between the pulverized biomass particles cannot be maintained and the pellet is disintegrated when the solid fuel is immersed in water. Therefore, Ymax may be determined so as to be the maximum yield where the solid fuel does not disintegrate when immersed in water (i.e. the solid fuel has water resistance). Ymax may also be determined by reference to the value of mechanical durability after the solid fuel is immersed in water. If the yield exceeds Ymax, the heat gas inlet temperature Tgin is raised and thereby a biomass solid fuel with improved water resistance can be obtained.

Ymax may be determined based on COD (chemical oxygen demand) of immersion water and/or HGI (Hardgrove grindability index) or the like of PBT, in addition to or instead of the above criteria based on water resistance of the solid fuel. The COD (chemical oxygen demand) means a COD value assayed in accordance with JIS K0102(2010)-17 for a sample of immersion water for COD determination prepared in accordance with Japan Environment Agency Announcement No. 13 "(A) a method for detecting a metal or the like contained in an industrial waste", 1973. When the yield Y is too high (that is, the heating temperature during PBT production is too low), COD becomes high, and thus during outdoor storage of PBT, problems such as increase of the elution of organic matter including tar component due to rain water or the like may occur. Therefore, for example, when the biomass raw material is rubber tree, Ymax may be determined so as to be the maximum yield where the COD is preferably 1000 mg/L or less. If the yield exceeds Ymax, the temperature of the heat gas inlet temperature Tgin is decided to be raised and thereby the biomass solid fuel with reduced COD can be obtained.

In some cases such as the solid fuel obtained by using acacia or *Pinus radiata* as a raw material described in Table 1 below, when heating temperature is comparatively low, COD may increase during heating. This is presumably because the tar component in the raw material remains without volatilizing due to the relatively low heating temperature, and the tar component is more easily eluted due to the decomposition of cellulose and the like by carbonization.

HOT (Hardgrove grindability index) is based on JIS M 8801, and the larger value thereof indicates better grindability. When the yield Y is too high (that is, the heating temperature during PBT production is too low), HOT becomes small, which may make it difficult to use as a fuel. Therefore, for example, when the biomass raw material is rubber tree, Ymax may be determined so as to be the maximum yield where HGI is preferably 20 or more. If the yield exceeds Ymax, the temperature of the heat gas inlet temperature Tgin is decided to be raised and thereby the biomass solid fuel with increased HGI can be obtained.

As described above, by controlling the heat gas inlet temperature Tgin so as to be in the range of Ymin≤Y≤Ymax, it is possible to obtain PET having desired properties.

FIG. 4 to FIG. 7B show the relationships between the solid yields and the maximum reaching temperatures of PET using the following raw materials respectively. The raw materials used are acacia for FIG. 4, trees belonging to Dipterocarpaceae for FIG. 5, *Pinus radiata* for FIG. 6, a mixture of 50 wt % of larch, 45 wt % of spruce and 5 wt % of birch for FIG. 7A, and a mixture of 30 wt % of spruce, 45 wt % of pine and 25 wt % of fir for FIG. 7B. Also in the case of these raw materials, when the yield Y is equal to or more than the predetermined value, the maximum reaching temperature in the self-heating property test is suppressed to less than 200° C. Thus, in the same way as the case where rubber tree is used as a raw material in FIG. 3, it is possible to reduce the self-heating of PBT by performing control with a specified lower limit value Ymin of yield Y. The upper limit value of yield Y is determined based on, for example, water resistance when immersing PBT in water, COD (chemical oxygen demand) of immersion water and/or HGI (Hardgrove grindability index) of PET and the like, in consideration of strength and water resistance of PET, pollution of discharged water and the like as in the case of rubber tree. In the same way, in the case of using biomass raw materials other than these, appropriate control can be performed by using the correlation between a yield and a maximum reaching temperature.

Figure 8:
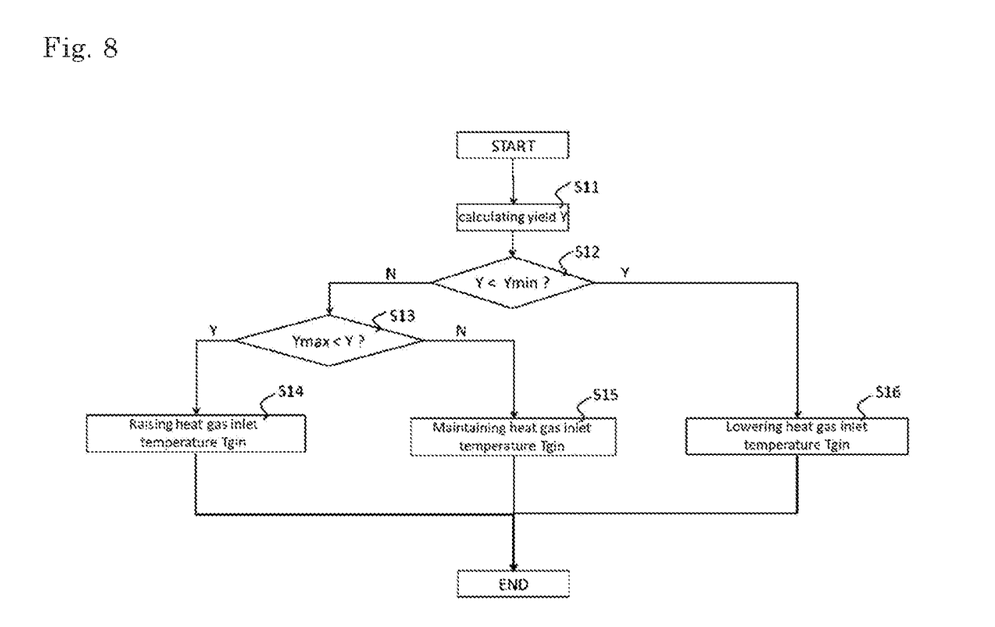
FIG. 8 is a control flow chart of Embodiment 1.

FIG. 8 is a control flow chart of Embodiment 1. In Embodiment 1, temperature control of the rotary kiln 2 is performed based on the yield Y of PET as described above.

In step S11, the yield Y is calculated.

In step S12, it is determined whether the calculated yield Y is less than the lower limit value Ymin. If it is YES, the yield Y is low and the temperature of the rotary kiln 2 is considered to be too high, and thus the heat gas inlet temperature Tgin is decided to be lowered in step S16. If it is NO, the flow goes to step S13.

In step S13, it is determined whether the yield Y is more than the upper limit value Ymax. If it is YES, the yield Y is high and the temperature of the rotary kiln 2 is considered to be too low, and thus the heat gas inlet temperature Tgin is decided to be raised in step S14. If it is NO, it satisfies Ymin≤Y≤Ymax and the temperature of the rotary kiln 2 is considered to be appropriate, and thus the heat gas inlet temperature Tgin is maintained in step S15.

The flow of Embodiment 1 may be periodically and repeatedly performed as in the case of known automatic control, or may be repeated as needed.

Embodiment 2: Control by Temperature of Carbonization Furnace

Table 1 shows the yields of PBT, the heating temperatures in the heating step 130, the maximum reaching temperatures in the self-heating property test and the like for various biomass as raw materials.

TABLE 1

| raw material | diameter of pellet mm | heating temperature ° C. | yield Y wt % -dry | volatile matter wt % -daf | Self-heating property test maximum reaching temperature ° C. | COD mg/L | HGI | mechanical durability after immersion in water (DU) |
|---|---|---|---|---|---|---|---|---|
| rubber tree | Φ7.5 pellet | 25 | 100 | 83.0 | 142 | 1100 | 17 | disintegration |
| | | 230 | 93.3 | 80.9 | 146 | 930 | 26 | 98.1 |
| | | 240 | 88.3 | 78.4 | 156 | 6.30 | 29 | 98.2 |
| | | 245 | 85.6 | 77.5 | 156 | 570 | 31 | 98.2 |
| | | 247 | 83.8 | 76.6 | 167 | — | — | — |
| | | 249 | 83.4 | 76.4 | 172 | — | 32 | — |

TABLE 1-continued

| raw material | diameter of pellet mm | heating temperature °C. | yield Y wt % -dry | volatile matter wt % -daf | Self-heating property test maximum reaching temperature °C. | COD mg/L | HGI | mechanical durability after immersion in water (DU) |
|---|---|---|---|---|---|---|---|---|
|  |  | 255 | 76.8 | 73.1 | 200 | 330 | 35 | 97.3 |
|  |  | 270 | 68.4 | 67.7 | 200 | 200 | 42 | 96.4 |
| acacia | Φ8 pellet | 25 | 100.0 | 83.1 | 142 | 310 | 18 | disintegration |
|  |  | 230 | 94.0 | 81.9 | 147 | 400 | 43 | 96.2 |
|  |  | 240 | 89.7 | 80.2 | 156 | 340 | 42 | 96.3 |
|  |  | 250 | 85.7 | 78.1 | 156 | 300 | 52 | 96.1 |
|  |  | 253 | 83.4 | 77.4 | 200 | 360 | 40 | 95.6 |
|  |  | 255 | 82.0 | 76.7 | 200 | — | — | — |
|  |  | 260 | 80.1 | 75.2 | 200 | 210 | 42 | 95.5 |
| trees of Diptero-carpaceae | Φ8 pellet | 25 | 100.0 | 84.4 | 142 | 560 | 23 | disintegration |
|  |  | 230 | 95.0 | 82.4 | 147 | 460 | 33 | 92.5 |
|  |  | 240 | 92.4 | 80.9 | 153 | 340 | 54 | 95.7 |
|  |  | 250 | 87.0 | 79.2 | 161 | 250 | 41 | 96.4 |
|  |  | 255 | 86.5 | 78.5 | 178 | — | 43 | — |
|  |  | 260 | 84.2 | 77.1 | 200 | 240 | 54 | 96.1 |
| Pinus radiata | Φ6 pellet | 25 | 100.0 | 87.2 | 143 | 750 | 24 | disintegration |
|  |  | 250 | 92.1 | 82.4 | 148 | 800 | 33 | 96.3 |
|  |  | 260 | 89.1 | 81.1 | 151 | 740 | 33 | 96.6 |
|  |  | 265 | 84.9 | 80.5 | 157 | 610 | 29 | 95.5 |
|  |  | 270 | 81.9 | 78.0 | 165 | 460 | 39 | 95.5 |
|  |  | 275 | 79.2 | 77.2 | 200 | 340 | 38 | 95.4 |
| larch + spruce + birch | Φ8 pellet | 25 | 100.0 | 85.9 | 143 | 3,600 | 17 | disintegration |
|  |  | 230 | 93.7 | 85.3 | 144 | 950 | 21 | 98.4 |
|  |  | 250 | 89.2 | 83.0 | 149 | 740 | 22 | 98.7 |
|  |  | 270 | 79.6 | 77.8 | 157 | 330 | 32 | 97.8 |
|  |  | 290 | 70.2 | 70.9 | 200 | 72 | 46 | 96.0 |
| spruce + pine + fir | Φ6 pellet | 25 | 100.0 | 85.6 | 143 | 1,500 | 18 | disintegration |
|  |  | 250 | 90.0 | 81.2 | 149 | 970 | 35 | 94.3 |
|  |  | 255 | 88.0 | 80.3 | 152 | 930 | 32 | 93.9 |
|  |  | 260 | 86.2 | 80.4 | 153 | 860 | 35 | 94.7 |
|  |  | 265 | 83.5 | 78.3 | 156 | 790 | 36 | 94.7 |
|  |  | 270 | 80.4 | 77.2 | 164 | 600 | 37 | 93.5 |
|  |  | 275 | 77.8 | 75.7 | 166 | 420 | 37 | 93.8 |
|  |  | 280 | 75.1 | 74.2 | 200 | 130 | 40 | 91.6 |

X-daf: dry ash free basis
dry: dry basis

In Table 1, mechanical durability (DU) after immersion in water was determined based on the following equation in accordance with the United States agriculture industry's standard ASAE S 269.4 and German Industrial Standard DIN EN 15210-1 for each solid fuel immersed in water for 168 hours.

$$DU=(m1/m0)\times 100$$

In the equation, m0 is a sample weight before rotation treatment, m1 is a sieve-on weight of sample after the rotation treatment, wherein the sieve used was a plate sieve having circle holes with 3.15 mm diameter. The term of "disintegration" described in the Table means the state in which pellets of biomass solid fuel were disintegrated because mutual bonding or adhesion between pulverized biomass particles could not be maintained due to immersion in water, and the measurement of mechanical durability was impossible.

From Table 1, since the temperature T of the rotary kiln 2 (heating temperature in the heating step 130) is correlated with the self-heating property (and yield Y) of PBT, in Embodiment 2, the control is performed based on the temperature of the rotary kiln 2 (in one aspect, the internal temperature T1 of the kiln). As the temperature of the rotary kiln 2, a kiln outlet temperature T2 may be used, or both of T1 and T2 may be used. When T1 and T2 are used together, an average value of these may be used.

Specifically, the highest temperature among the heating temperatures T1 where the self-heating property is less than 200° C. is set in advance as Tmax. For example, in the case of rubber tree, when the heating temperature is 250° C. or less, the self-heating property is suppressed to less than 200° C., and therefore control is performed with Tmax=250° C. On the other hand, when the heating temperature T1 is too low, problems such as strength and water resistance of PBT and pollution of discharged water will occur as described above. Therefore, the lower limit value Tmin of the heating temperature T1 is set in advance (for example, Tmin=200° C. for rubber trees), and control is performed so that Tmin≤T1≤Tmax is satisfied. Tmin may be, for example, the lowest temperature among the heating temperatures giving PBT which is not disintegrated when it is immersed in water and has water resistance. Furthermore, the value of mechanical durability after immersion in water may be referred to. Alternatively, Tmin may be determined based on COD (chemical oxygen demand) of immersion water and/or HGI (grindability index) of PBT. For example, when the biomass raw material is rubber tree, Tmin may be the lowest temperature among the temperatures T1 at which COD is preferably 1000 mg/l, or less. Alternatively, when the biomass of the raw material is rubber tree, Tmin may be the lowest temperature among the temperatures T1 at which HOT is preferably 20 or more. Embodiment 2 will be described using the kiln internal temperature T1, but the kiln outlet temperature T2 may be used instead, or T1 and T2 may be used together as appropriate.

Figure 9:
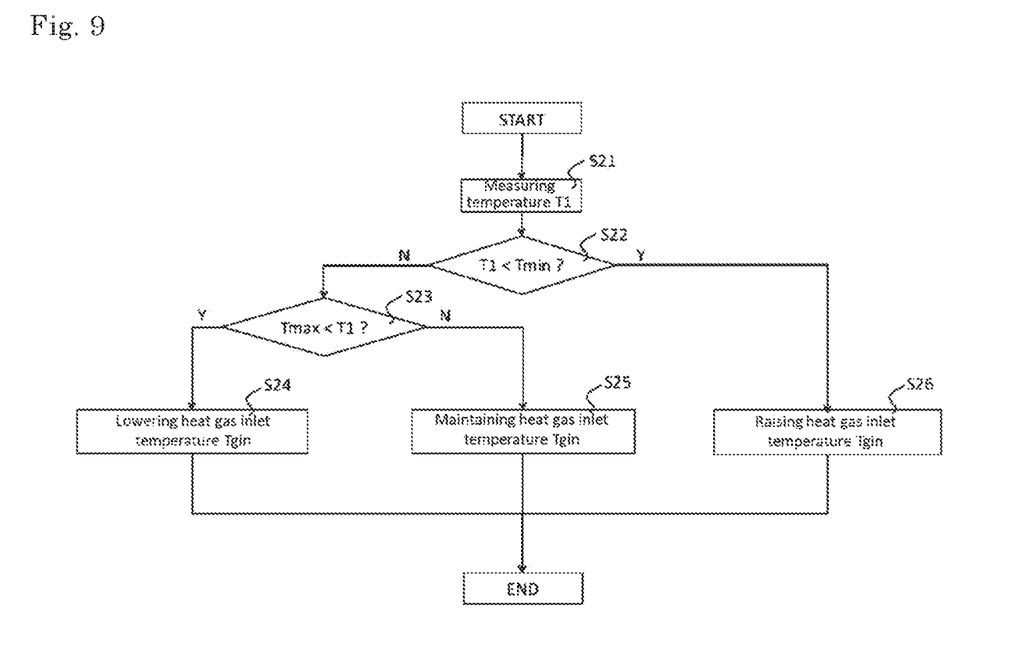
FIG. 9 is a control flow chart of Embodiment 2.

FIG. 9 is a control flow chart of Embodiment 2.

In step S21, the kiln internal temperature T1 is measured.

In step S22, it is determined whether T1 is less than the lower limit value Tmin. If it is YES, the temperature of the rotary kiln 2 is too low and thus the heat gas inlet temperature Tgin is decided to be raised in step S26. If it is NO, the flow goes to step S23.

In step S23, it is determined whether T1 is more than the upper limit value Tmax. If it is YES, the temperature of the rotary kiln 2 is too high and thus the heat gas inlet temperature Tgin is decided to be lowered in step S24. If it is NC), it satisfies Tmin≤T1≤Tmax, the temperature of the rotary kiln 2 is appropriate and thus the heat gas inlet temperature Tgin is maintained in step S25.

The flow of Embodiment 2 may be periodically and repeatedly performed as in the case of known automatic control, and may be repeated as needed.

Embodiment 3: Control by Yield and Temperature

Figure 10:
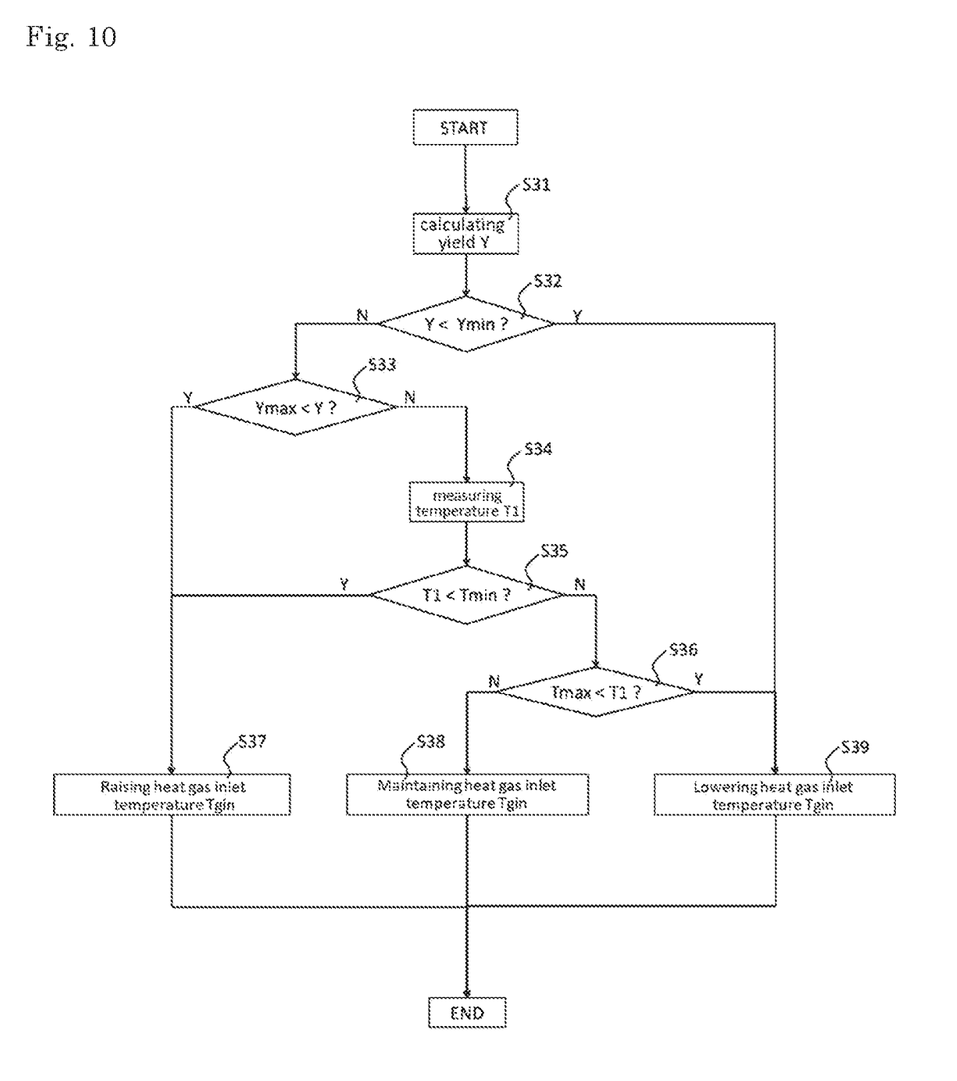
FIG. 10 is a control flow chart of Embodiment 3.

FIG. 10 is a control flow chart of Embodiment 3. This embodiment performs control with higher accuracy by using both the yield and the temperature of the rotary kiln 2. Although FIG. 10 is described using the kiln internal temperature T1 as in the same manner as Embodiment 2, a kiln outlet temperature T2 may be used, or both of T1 and T2 may be appropriately used. When T1 and T2 are used together, an average value of these may be used. In Embodiment 3, upper limit value Ymax and lower limit value Ymin of yield Y can be determined in the same manner as in Embodiment 1, and the upper limit temperature value Tmax and the lower limit temperature value Tmin can be determined in the same manner as in Embodiment 2. These values are preset in the controller of the apparatus for manufacturing a biomass solid fuel.

In step S31, the yield Y is calculated.

In step S32, it is determined whether the calculated yield Y is less than the lower limit value Ymin. If it is YES, the yield Y is low and the temperature of the rotary kiln 2 is too high, and thus the heat gas inlet temperature Tgin is decided to be lowered in step S39. If it is NO, the flow goes to step S33.

In step S33, it is determined whether the yield Y is more than the upper limit value Ymax. If it is YES, the yield Y is high and the temperature of the rotary kiln 2 is considered to be too low, and thus the heat gas inlet temperature Tgin is decided to be raised in step S37. If it is NO, it satisfies Ymin≤Y≤Ymax and the yield Y is in the appropriate range, but in order to perform control based on the kiln internal temperature T1, the flow goes to step S34.

In step S34, the kiln internal temperature T1 is measured.

In step S35, it is determined whether T1 is less than the lower limit value Tmin. If it is YES, the temperature of the rotary kiln 2 is considered to be too low and thus the heat gas inlet temperature Tgin is decided to be raised in step S37. If it is NO, the flow goes to step S36.

In step S36, it is determined whether T1 is more than the upper limit value Tmax. If it is YES, the temperature of the rotary kiln 2 is considered to be too high and thus the heat gas inlet temperature Tgin is decided to be lowered in step S39. If it is NO, it satisfies Tmin≤T1≤Tmax and the temperature of the rotary kiln 2 is considered to be appropriate, and thus the heat gas inlet temperature Tmin is maintained in step S38.

As described above, in Embodiment 3, even if the yield Y is in the appropriate range, the heat gas inlet temperature Tgin can be adjusted when the kiln internal temperature T1 is not in the appropriate range, and therefore the control accuracy is improved.

The flow of Embodiment 3 may be periodically and repeatedly performed as in the case of known automatic control, and may be repeated as needed.

Advantageous Effect

The preferred embodiments of the present invention and their effects will be described. It is also preferable to combine a plurality of the embodiments of the following (1) to (6).

(1) An apparatus for manufacturing a biomass solid fuel comprises: a carbonization furnace (rotary kiln 2) for carbonizing a biomass molded block to obtain a biomass solid fuel; a yield calculator 3a for calculating a yield Y of the biomass solid fuel and/or a temperature detector 41 and 42 for measuring a temperature of the carbonization furnace (T1, T2); and a controller 3 for controlling a heat source 6 of the carbonization furnace; wherein the controller 3 controls the heat source based on a correlation between (i) a self-heating property of the biomass solid fuel and (ii) the yield Y and/or the temperature of the carbonization furnace T1 (which may be T2 or both of T1 and T2).

As a result, it is possible to obtain a good fuel whose self-heating is suppressed.

(2) The controller 3 stores a lower limit value Ymin of the yield Y in advance, and when the yield is less than the lower limit value Ymin, the controller lowers the temperature of the heat source (heat gas inlet temperature Tgin). Since there is a strong correlation between the yield and the self-heating property, the lower limit value of the yield where the self-heating property becomes the desired value or less is set in advance and thus efficient production is possible by controlling the temperature of the heat source based on the lower limit value.

(3) The controller 3 stores an upper limit temperature value Tmax of the carbonization furnace in advance, and when the temperature of the carbonization furnace is more than the upper limit temperature value Tmax, the temperature of the heat source is decided to be lowered. Since there is a strong correlation between the self-heating property and the temperature of the carbonization furnace, the upper limit temperature value of the carbonization furnace where the self-heating property becomes the desired value or less is set in advance, and thus efficient production is possible by controlling the temperature of the heat source based on the upper limit temperature value.

(4) The controller 3 stores the upper limit value Ymax of the yield Y in advance, and when the yield Y is more than the upper limit Ymax, the temperature of the heat source is decided to be raised. If the yield is unnecessarily high, the properties of PBT are deteriorated (strength, water resistance, pollution of discharged water and the like). Therefore, the desired PBT can be obtained by setting the upper limit value Ymax.

(5) The controller 3 stores the lower limit temperature value Tmin of the carbonization furnace in advance, and when the temperature of the carbonization furnace is less than the lower limit temperature value Tmin, the temperature of the heat source is decided to be raised. If the temperature of the carbonization furnace is low, the properties of PBT are deteriorated (strength, water resistance, pollution of discharged water and the like). Therefore, the desired PBT can be obtained by setting the lower limit temperature value Tmin.

(6) The temperature detectors 41 and 42 respectively measure an internal temperature of the carbonization furnace T1 and an outlet temperature of the carbonization furnace T2.

Controllability can be improved by using the internal temperature of the carbonization furnace (kiln internal temperature) T1 and/or the outlet temperature (kiln outlet temperature) T2, The internal temperature of the carbonization furnace T1 is advantageous in accuracy, and the outlet temperature T2 is advantageous in that the temperature of the biomass solid fuel can be measured directly, and good control characteristics can be attained by appropriately using each or using them together. For example, control may be performed based on the average of T1 and T2.

EXPLANATION OF REFERENCE 2 rotary kiln
3 controller
3a yield calculator
6 heat source
41, 42 temperature detector

The invention claimed is:

1. An apparatus for manufacturing a biomass solid fuel, comprising:
    a carbonization furnace for carbonizing a biomass molded block to obtain a biomass solid fuel;
    a yield calculator for calculating a yield of the biomass solid fuel and/or a temperature detector for measuring a temperature of the carbonization furnace; and
    a controller for controlling a heat source of the carbonization furnace; wherein the controller controls the heat source based on a correlation between (i) a self-heating property of the biomass solid fuel and (ii) the yield and/or the temperature of the carbonization furnace, wherein the correlation is determined in advance depending on a raw material of the biomass molded block.

2. The apparatus for manufacturing a biomass solid fuel according to claim 1, wherein
    the controller stores a lower limit value of the yield, which is determined in advance depending on a raw material of the biomass molded block, and
    when the yield calculated by the yield calculator is less than the lower limit value, the controller lowers the temperature of the heat source.

3. The apparatus for manufacturing a biomass solid fuel according to claim 1, wherein
    the controller stores an upper limit temperature value of the carbonization furnace, which is determined in advance depending on a raw material of the biomass molded block and
    when the temperature measured by the temperature detector is more than the upper limit temperature value, the controller lowers the temperature of the heat source.

4. The apparatus for manufacturing a biomass solid fuel according to claim 2, wherein
    the controller stores an upper limit value of the yield in advance, and
    when the yield calculated by the yield calculator is more than the upper limit value, the controller raises the temperature of the heat source.

5. The apparatus for manufacturing a biomass solid fuel according to claim 3, wherein
    the controller stores a lower limit temperature value of the carbonization furnace in advance, and
    when the temperature of the carbonization furnace is less than the lower limit temperature value, the controller raises the temperature of the heat source.

6. The apparatus for manufacturing a biomass solid fuel according to claim 1, wherein
    the temperature detector measures an internal temperature of the carbonization furnace and/or an outlet temperature of the carbonization furnace.

7. A method of carbonizing a biomass molded block in a carbonization furnace to obtain a biomass solid fuel, wherein a heat source of the carbonization furnace is controlled based on a correlation between (i) a self-heating property of the biomass solid fuel and (ii) a yield of the biomass solid fuel and/or a temperature of the carbonization furnace, wherein
    the correlation is determined in advance depending on a raw material of the biomass molded block.

* * * * *

UNITED STATES PATENT AND TRADEMARK OFFICE
CERTIFICATE OF CORRECTION

PATENT NO. : 11,198,829 B2
APPLICATION NO. : 16/652624
DATED : December 14, 2021
INVENTOR(S) : Yuusuke Hiraiwa, Shigeya Hayashi and Nobuyuki Ooi It is certified that error appears in the above-identified patent and that said Letters Patent is hereby corrected as shown below:

In the Specification

In Column 1, Line 54, delete "and the" and insert --and (ii) the--.

In Column 2, Line 64, delete "130," and insert --130.--.

In Column 4, Line 12, delete "yield." and insert --yield--.

In Column 4, Line 31, delete "yield." and insert --yield--.

In Column 4, Line 41, delete "that," and insert --that--.

In Column 5, Line 44, delete "HOT" and insert --HGI--.

In Column 5, Line 47, delete "HOT" and insert --HGI--.

In Column 6, Line 3, delete "PET" and insert --PBT--.

In Column 6, Line 5, delete "PET" and insert --PBT--.

In Column 6, Line 21 (Approx.), delete "PET" and insert --PBT--.

In Column 6, Line 22 (Approx.), delete "PET," and insert --PBT,--.

In Column 6, Line 29 (Approx.), delete "PET" and insert --PBT--.

In Columns 5-6, TABLE 1, Line 9, delete "6.30" and insert --630--.

In Column 8, Line 66, delete "mg/l," and insert --mg/L--.

Signed and Sealed this
Twenty-fourth Day of May, 2022

Katherine Kelly Vidal
*Director of the United States Patent and Trademark Office*

CERTIFICATE OF CORRECTION (continued)
U.S. Pat. No. 11,198,829 B2

In Column 9, Line 2, delete "HOT" and insert --HGI--.

In Column 9, Line 16 (Approx.), delete "NC)," and insert --NO,--.

In Column 10, Line 2, delete "Tmin" and insert --Tgin--.

In Column 10, Line 4, delete "yield." and insert --yield--.

In Column 11, Line 14, delete "T2," and insert --T2.--.

In the Claims

In Column 12, Claim 2, Line 1, delete "yield," and insert --yield--.

In Column 12, Claim 3, Line 10, delete "furnace," and insert --furnace--.